US012733638B2

(12) United States Patent
Hemminghaus et al.

(10) Patent No.: US 12,733,638 B2
(45) Date of Patent: Sep. 15, 2026

(54) HPPD AND PPO AGROCHEMICAL FORMULATIONS CONTAINING DRIFT REDUCTION TECHNOLOGIES

(71) Applicant: Ethox Chemicals, LLC, Greenville, SC (US)

(72) Inventors: John Hemminghaus, Greenville, SC (US); John M. Moyer, IV, Greenville, SC (US); Elizabeth H. Lowe, Greenville, SC (US); Barbara Houston, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 281 days.

(21) Appl. No.: 18/202,566

(22) Filed: May 26, 2023

(65) Prior Publication Data

US 2023/0389541 A1 Dec. 7, 2023

Related U.S. Application Data

(60) Provisional application No. 63/346,591, filed on May 27, 2022.

(51) Int. Cl.

*A01N 25/24* (2006.01)
*A01N 25/04* (2006.01)
*A01N 41/10* (2006.01)
*A01N 43/653* (2006.01)

(52) U.S. Cl.

CPC ............. *A01N 25/24* (2013.01); *A01N 25/04* (2013.01); *A01N 41/10* (2013.01); *A01N 43/653* (2013.01)

(58) Field of Classification Search

None

See application file for complete search history.

(56) References Cited

U.S. PATENT DOCUMENTS

| | | | | |
|---|---|---|---|---|
| 2011/0118121 | A1 | 5/2011 | Sun | |
| 2018/0192644 | A1 * | 7/2018 | Baur ...................... | A01N 25/30 |
| 2019/0133117 | A1 | 5/2019 | Liu et al. | |
| 2021/0212316 | A1 | 7/2021 | Gao et al. | |

FOREIGN PATENT DOCUMENTS

| | | | |
|---|---|---|---|
| CN | 102948423 | A | 3/2013 |
| CN | 106665592 | A | 5/2017 |
| CN | 109221220 | A | 1/2019 |
| JP | H05148113 | A | 6/1993 |
| JP | 2008-542170 | A | 11/2008 |
| JP | 2013-544865 | A | 12/2013 |
| JP | 2015-512390 | A | 4/2015 |
| WO | 2007/123069 | A | 11/2007 |
| WO | 2015/069984 | A1 | 5/2015 |
| WO | 2018/126017 | A1 | 7/2018 |
| WO | WO 2021/030856 | A1 | 2/2021 |
| WO | 2021/142295 | A1 | 7/2021 |
| WO | WO 2021/142301 | A2 | 7/2021 |
| WO | WO 2021/180640 | A1 | 9/2021 |
| WO | WO 2022/023255 | A1 | 2/2022 |
| WO | WO 2022/233758 | A1 | 11/2022 |

OTHER PUBLICATIONS

Evidence: Thornton, K., Sprayers 101, “Can Nozzle Type, Carrier Volume or the use of an Adjuvant Improve the Control of Cercospora Leaf Spot in Sugarbeets?”, published Sep. 21, 2021, accessed Dec. 18, 2025. (Year: 2021).*

Evidence: CDMS, “InterLock® Drift Control Agent, Canopy Penetrant, Deposition Aid”, accessed Dec. 18, 2025. (Year: 2025).*

ISA/US; International Search Report and Written Opinion prepared for PCT/US2023/023688; Ethox Chemicals, LLC; date mailed: Nov. 2, 2023.

Extended European Search Report for EP 23812629.6 from PCT/US2023023688, dated Apr. 28, 2026 (11 pages).

Google translation of Japanese cited reference JP2015-512390A (11 pages).

Translation of Japanese cited reference JP2013-544865A (16 pages).

Translation of Japanese cited reference JPH0548113A (5 pages).

Google translation of Japanese cited reference JP2008-542170A (6 pages).

Translation of PCT cited reference WO2007/123069A (8 pages).

Office Action in Japanese Patent App. No. 2024-569366 dated Jun. 5, 2026 (5 pages).

Translation of Office Action in Japanese Patent App. No. 2024-569366 dated Jun. 5, 2026 (5 pages).

* cited by examiner

*Primary Examiner* — David J Blanchard
*Assistant Examiner* — Kaeleigh E Olsen
(74) *Attorney, Agent, or Firm* — Thrive IP®; Jeremy M. Stipkala; Olivia Wozniak

(57) ABSTRACT

An improved agrochemical formulation, and method for treating crops, is provided herein. The agrochemical formulation comprises at least one herbicide selected from the group consisting of a 4-hydroxyphenylpyruvate dioxygenase herbicide and a protoporphyrinogen oxidase inhibiting herbicide; and an organic drift control agent.

38 Claims, 8 Drawing Sheets

HPPD AND PPO AGROCHEMICAL FORMULATIONS CONTAINING DRIFT REDUCTION TECHNOLOGIES

CROSS-REFERENCE TO RELATED APPLICATIONS

This application claims priority to U.S. Provisional Application No. 63/346,591 filed May 27, 2022 which is incorporated herein by reference.

FIELD OF THE INVENTION

The disclosure is related to improved formulations for use in the treatment of crops. More specifically, the present invention is related to improvements in crop treatment formulations having improved drift control properties.

BACKGROUND

Existing technology utilizes 4-Hydroxyphenylpyruvate dioxygenase (HPPD)-inhibiting and Protoporphyrinogen oxidase (PPO)-inhibiting herbicides and drift control agents (DRA) as separate additions to the tank mix. DRAs are beneficial for controlling the spray pattern during application of herbicides. Oil based DRAs are most preferred in some cases because they reduce the amount of fine particles with less of an impact to average spray particle size which can be important for herbicide deposition and performance. Common HPPD and PPO-inhibiting herbicides, such as mesotrione and sulfentrazone, are commonly formulated as suspension concentrates when formulated alone. The inclusion of an oil-based product typically requires that the formulation type be adjusted to suspoemulsion. Suspoemulsion based formulations are known in the art to be problematic for formulation stability and have required the use of different additives, including copper chelation additives and additives which encapsulate the oil-based materials to overcome the chemical and physical stability challenges. It is expected that the inclusion of oil-based DRAs would also require a suspoemulsion type formulation which are often associated with accelerated degradation of the herbicide. The challenges of physical and chemical stability in the presence of oils have led most formulators to explore the use of water based drift reduction polymers such as polyacrylamides, polyacrylates and guar gum along with these herbicides. However, as has been discovered recently, water based drift reduction polymers can have negative effects on formulation stability, most notably high viscosity and gelling, which results in formulations containing them being less effective at reducing the percentage of fine particles. There has been a desire in the art for a stable in-can product that combines an oil-based DRA in a water-based system with HPPD- and/or PPO-inhibiting herbicides without degradation of the active(s), yet which exhibit acceptable physical stability and a reduction in spray particle size for the purpose of reducing drift. Such a desire has not been met in the art.

SUMMARY OF THE INVENTION

The present invention is related to an improved crop treatment formulation comprising HPPD-inhibiting herbicides and PPO-inhibiting herbicides with an oil-based drift reduction agent. The HPPD and PPO-inhibiting herbicides can be formulated separately or together in a formulation comprising multiple active herbicides.

One particular feature of the invention is the stability, particularly chemical stability and physical stability, without unacceptable separation of the components of the formulation or the degradation of the herbicide active ingredients.

Another particular feature of this invention is the reduction of fine particles, defined as those particles with a size of less than 150 microns, which result in less off-target deposition.

These and other embodiments, as will be realized, are provided in an agrochemical formulation comprising:

at least one herbicide selected from the group consisting of a 4-hydroxyphenylpyruvate dioxygenase herbicide and a protoporphyrinogen oxidase inhibiting herbicide; and an oil-based drift control agent.

Yet another embodiment is provided in a method for treating a crop comprising:

spraying said crop with an agrochemical formulation comprising:

at least one herbicide selected from the group consisting of a 4-hydroxyphenylpyruvate dioxygenase inhibiting herbicide and a protoporphyrinogen oxidase inhibiting herbicide; and an oil-based drift control agent.

DESCRIPTION

Figure 1:
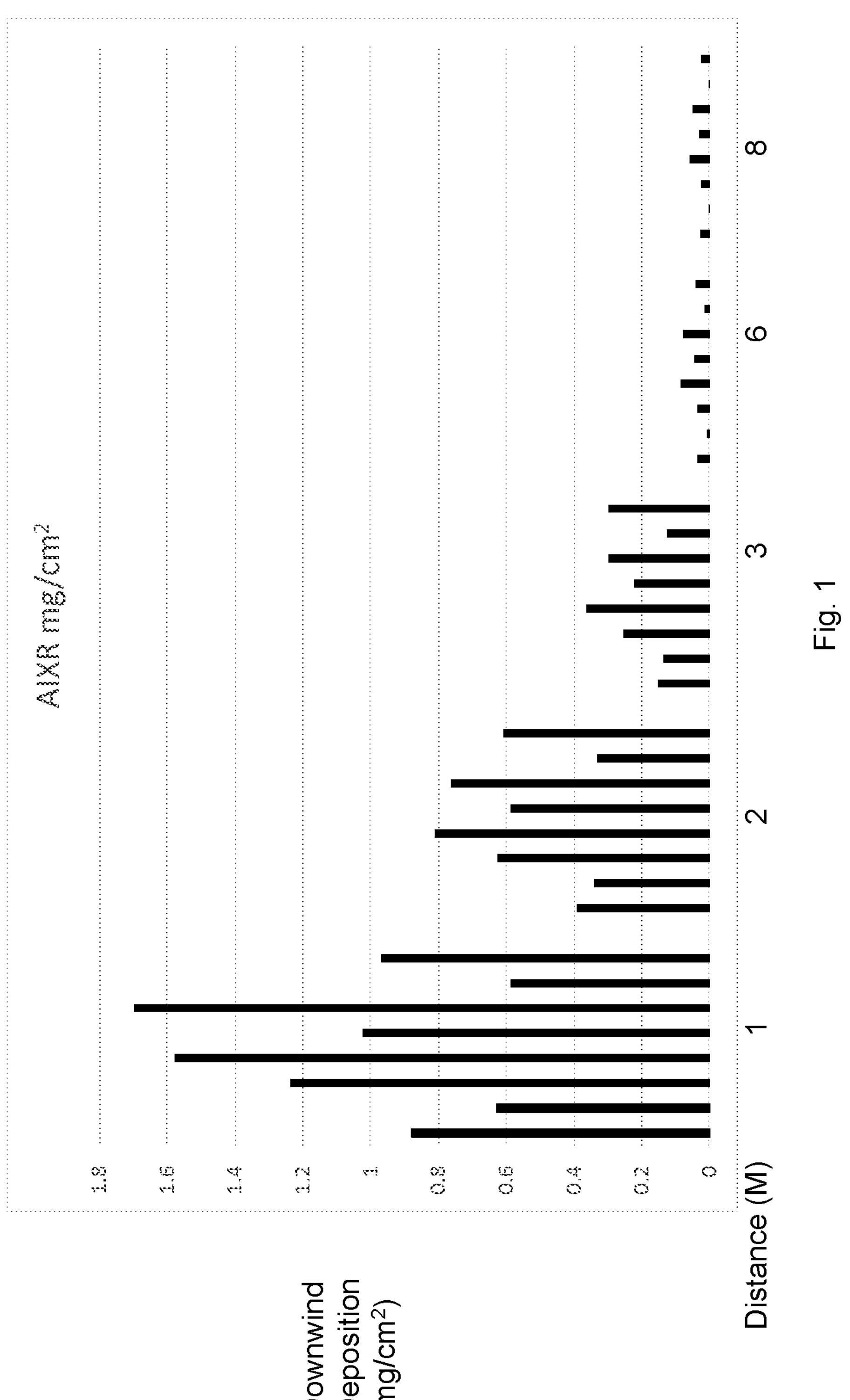
FIG. 1 is a graphical representation of downwind deposition for eight compositions from the AIXR11004 Nozzle.

The present invention is related to improved crop treatment formulations and particularly crop treatment formulations which are stable and provide good drift control properties. More specifically, the present invention is related to a stable in-can product that combines an oil-based DRA in a water based system with HPPD and PPO inhibiting herbicides, without degradation of the active components, for subsequent dilution and application preferably by spraying.

With the advent of herbicide tolerant (HT) crops new use patterns for HPPD and PPO inhibiting herbicides are emerging. Expanded use windows and new uses across crops may increase the likelihood of off-target movement of these herbicides. The present invention decreases the number of fine particles from sprays thus reducing the amount of product which might move off target due to particle drift. Oil-based drift reduction agents of this type are preferred for use with these products because they are less likely to increase average spray particle size while reducing fine particles, which can mean less of an impact to herbicide efficacy compared to water-based polymers, such as polyacrylamide. Having the oil-based drift reduction technology provided with the herbicide ensures it will be used on every application and reduces the need for additional products. Combining the herbicide and oil-based drift reduction technology in a common package also improves storage and distribution. This invention overcomes the stability challenges that previously made this infeasible.

In an embodiment of the invention the oil-based DRA is provided alone or in combination with HPPD inhibiting herbicides and/or PPO inhibiting herbicides as an agrochemical formulation which is then diluted at the time of use. The agrochemical formulation preferably comprises about 10-70 wt %, more preferably 20-60 wt % and more preferably 30-50 wt % herbicide, and about 10-30 wt % oil-based DRA with the balance being other ingredients. Other herbicides can be incorporated if desired. In an embodiment the agrochemical formulation does not include auxin based herbicides.

An aspect of the invention is fine particle reduction. The percentage of fine particles can be from two techniques. One technique is to increase the average particle size without changing the particle size distribution. This technique, which is often employed in the art, reduces the fine particles, however, the average particle size increases which can be detrimental to spray characteristics. A particular feature of the instant invention is the ability to decrease the percentage of fine particles without significant increase in average particle size or particle size distribution. Fine particle reduction is defined in accordance with industry standards wherein the reduction in fine particles is defined relative to the percentage of fine particles in an identical herbicide formulation excluding the drift reduction agent being tested. The present invention provides a fine particle reduction of at least 5 wt % to no more than 75 wt % with no more than 25% increase in average particle size. More preferably the fine particle reduction is at least 5 wt % to no more than 50 wt %, even more preferably at least 10 wt % to 40 wt %, even more preferably at least 15 wt % to no more than 30 wt % and most preferably at least 20 wt % to no more than 25 wt %. Increasing the fine particle reduction further may negatively impact the average particle size or particle size distribution.

A preferred oil-based DRA is a blend comprising organic compounds selected from a vegetable oil or methylated vegetable oil, ethoxylated fatty acid and ethoxylated polyol esterified with fatty acids. In a preferred embodiment the oil-based DRA comprises soybean oil or methylated soybean oil, ethoxylated oleate, and ethoxylated glycerin esterified with poly(hydroxystearic acid). A particularly suitable oil-based DRA for demonstration of the invention comprises 85-94.5 wt % methylated soybean oil, 0.5-3 wt % polyethoxylated (POE) tall oil fatty acid and 5-12 wt % POE glycerin esterified with 12 hydroxy stearic acid. The POE tall oil fatty acid is preferably ethoxylated with 3-20 ethylene oxide groups. The glycerin is preferably ethoxylated with 3-35 ethylene oxide groups. Not all DRAs are suitable for co-formulation in the described invention. For a DRA to be suitable for inclusion it needs to have acceptable physical stability, chemical stability and drift reduction performance at relevant commercial concentrations.

HPPD-inhibitors are a class of herbicides that prevent growth in plants by blocking HPPD which is an enzyme in plants that breaks down the amino acid tyrosine into molecules that are then used by plants to create other molecules that plants need. HPPD-inhibitors are Group 27 Herbicides including: Isoxazoles; Isoxaflutole; Pyrazoles; Benzofenap; Pyrasulfotole; Pyrazolynate; Pyrazoxyfen; Topramezone; Tolpyralate; Triketones; Benzobicyclon; Bicyclopyrone; Fenquinotrione; Mesotrione; Sulcotrione; Tembotrione and Tefuryltrione.

PPO inhibitors are a class of herbicides that prevent growth in plants by blocking PPO which is an enzyme in plants that produce the precursor to both chlorophyll and heme, which are needed for photosynthesis and electron transfer chains within the cell. The PPO-inhibitors not only block the production of chlorophyll and heme, but cause the formation of highly reactive molecules that result in the disruption of the cell membrane and disintegration of cell organelles. PPOs are Group 14 Herbicides including: Diphenyl ethers; Lactofen; Acifluorfen; Bifenox; Chlornitrofen; Fomesafen; Fluorodifen; Fluoroglycofen-ethyl; Fluoronitrofen; Nitrofen; Oxyfluorfen; Chlomethoxyfen; Phenylpyrazoles; Pyraflufen-ethyl; N-Phenyl-oxadiazolones; Oxadiargyl; Oxadiazon; N-Phenyl-triazolinones; Azafenidin; Carfentrazone-ethyl; Sulfentrazone; N Phenyl-imides; Fluthiacet-methyl; Butafenacil; Saflufenacil; Pentoxazone; Chlorphthalim; Cinidon-ethyl; Flumiclorac-pentyl; Flumioxazin; Flumipropyn; Trifludimoxazin; Tiafenacil and Pyraclonil.

The inventive formulation exhibits superior stability. By way of example, through two weeks of Freeze/Thaw cycles and up to 6 weeks at 4° C. no separation was observed with the inventive formulations. In 35° C. up to 12 weeks, a thin layer of separation was observed at the top of the product with the inventive formulations, but the thin layer easily returned to a homogenous state with a few inversions.

A particular feature of the invention is the ability to provide agrochemical formulations, particularly spray formulations, with improved drift control properties without the inclusion of additives selected from polymers, particularly polymers selected from the group consisting of polyacrylamides and polyacrylates; natural product thickeners such as guar gum. A second feature of the invention is the ability to provide a chemically stable formulation, with no degradation of the active ingredient without metal additives such as copper. More specifically, the present invention provides an agrochemical formulation with no more than 25 wt %, preferably no more than 10 wt %, more preferably no more than 5 wt %, more preferably no more than 2 wt % and most preferably no more than 0.5 wt % of additive. The ability to avoid the use of those materials typically thought to be necessary in HPPD and PPO agrochemical formulations minimizes the chemicals applied to the crops, reduces cost, and simplifies the entire manufacturing and supply chain for agrochemical formulation manufacture and use.

Another particular feature of the invention is stability. For the purposes of the present invention a formulation is defined as stable if the concentration of the herbicide drops less than 10 wt % after storage for 12 weeks at 35° C. More preferably the concentration of the herbicide drops less than 5 wt % after storage for 12 weeks at 35° C. and even more preferably less than 3 wt %.

EXAMPLES

TABLE 1

| Formulation Ingredients | |
|---|---|
| OB DRA | Oil based drift reduction agent developed and sold by Ethox Chemicals as Ethox 5022 |
| CDRA | Emulsion type drift reduction agent and deposition aid available as InterLock ® from Winfield Solutions |
| Superfloc A110 | Anionic polyacrylamide polymer available from Kemira |
| Superfloc A130 | Anionic polyacrylamide polymer available from Kemira |
| Superfloc A150 | Anionic polyacrylamide polymer available from Kemira |
| Superfloc N300 | Nonionic polyacrylamide polymer available from Kemira |
| HAF73 | Co-polymer of polyacrylate and polyacrylamide available from Polymer Ventures |
| HAF63 | Co-polymer of polyacrylate and polyacrylamide available from Polymer Ventures |
| SC-1604 | Polyacrylate polymer available from Polymer Ventures |
| Cab-O-Sil M5 | Fumed silica available from Cabot Corp |
| Attagel 50 | Attapulgite clay available from BASF |
| Xanthan Gum | Rhodopal 23 available from Solvay |
| Proxel GXL | Antimicrobial product available from Lonza |
| SAG 1572 | Silicone based antifoam available from Momentive |
| Ethox 5037 | Dispersant polymer available from Ethox Chemicals |
| Ethox 4420 | Nonionic EOPO Block Co-Polymer available from Ethox Chemicals |
| InterLock ® | Emulsion type drift reduction agent and deposition aid available from Winfield Solutions |
| Callisto ® | Callisto ® is a 40% active, suspension concentrate formulation of mesotrione available from Syngenta |
| RUPM3 | Roundup Powermax ® 3 Herbicide available from Bayer Crop Science |
| Reign ® | Reign ® is a water-based deposition aid and drift control agent available from Loveland Products |

The general method used to prepare HPPD-inhibitor formulations comprised four steps. The first step was preparation of a large mill base made by mixing 40.82% Mesotrione (98%) with 30.55-30.95% water, 4% propylene glycol, dispersing agent (3.75% Ethox™ 5037) a wetting agent (1.25% Ethox™ 4420), and 0.15% SAG® 1572. The mixture was milled to the desired herbicide particle size. Step two included the addition of a slurry comprising the thickener. During Step 2 the mill base was divided in half so that two thickeners could be evaluated. Slurry 1 comprised 5% propylene glycol, 0.13% Proxel® GXL and 0.2% Xanthan Gum. For the formula using Slurry 1, 5.33% of Slurry 1 was added the the mesotrione millbase prepared in Step 1. Slurry 2 comprised 0.2% Xanthan Gum, 0.4% Attagel® 50, 5% propylene glycol and 0.13% Proxel® GXL. For formulas using Slurry 2, 5.73% of Slurry 2 was added to the mesotrione millbase prepared in Step 1. After the slurries were found to be appropriately mixed, the DRA material was incorporated representing Step 3. Each batch of mill base with thickener was divided out so that various drift reduction agents could be mixed in using a paddle blade. After the DRA was deemed to be fully incorporated, the end products were buffered using phosphoric acid to the desired pH representing Step 4.

From the general procedure described in the preceding paragraph the following mesotrione formulations were prepared using 12% Ethox™ OB DRA. They are described in the Table 2.

TABLE 2

| Lot# | Coinciding lab samples | PAT Lab samples | DRA | Thickener system |
|---|---|---|---|---|
| BP5-044A | BH1-08A1<br>LAH24-14A1 | LAH24-07A1<br>LAH24-10 | OB DRA<br>(Ethox) 12% | Slurry 1 |
| BP5-044B | BH1-08B1<br>LAH24-14B1 | LAH24-07A2 | OB DRA<br>(Ethox) 12% | Slurry 2 |

The following formulations were prepared using SC-1604 or polyacrylamide at 0.1% wt %. They are described in Table 3.

TABLE 3

| Lot# | spray chamber samples | DRA, 0.1% | Thick-ener |
|---|---|---|---|
| BP6-002A1 | LAH24-03A1 | SC-1604 (Polymer Ventures) | Slurry 1 |
| BP6-002A2 | LAH24-03A2 | | Slurry 2 |
| BP6-002B1 | LAH24-03B1 | Superfloc A130 (Kemira) | Slurry 1 |
| BP6-002B2 | LAH24-03B2 | | Slurry 2 |
| BP6-002C1 | LAH24-03C1 | Superfloc | Slurry 1 |
| BP6-002C2 | LAH24-03C2 | A110(BP)/A150(LAH) (Kemira) | Slurry 2 |
| BP6-002D1 | LAH24-03D1 | Superfloc N300 (Kemira) | Slurry 1 |
| BP6-002D2 | LAH24-03D2 | | Slurry 2 |
| BP6-002E1 | LAH24-03E1 | HAF73 (Polymer Ventures) | Slurry 1 |
| BP6-002E2 | LAH24-03E2 | | Slurry 2 |
| BP6-002F1 | LAH24-03F1 | HAF63 (Polymer Ventures) | Slurry 1 |
| BP6-002F2 | LAH24-03F2 | | Slurry 2 |

The following formulations were prepared using SC-1604 or polyacrylamide at 1 wt %. They are described in Table 4.

TABLE 4

| Lot# | Spray chamber samples | DRA, 1% | Thick-ener |
|---|---|---|---|
| BP6-003A1<br>BP6-005A1 | LAH24-03G1 | SC-1604 (Polymer Ventures) | Slurry 1 |
| BP6-003A2<br>BP6-005A2 | LAH24-03G2 | | Slurry 2 |
| BP6-003B1 | | Superfloc A130 (Kemira) | Slurry 1 |
| BP6-003B2 | | | Slurry 2 |
| BP6-003C1 | | Superfloc | Slurry 1 |
| BP6-003C2 | | A110(BP)/A150(LAH) (Kemira) | Slurry 2 |
| BP6-003D1 | | Superfloc N300 (Kemira) | Slurry 1 |
| BP6-003D2 | | | Slurry 2 |
| BP6-003E1<br>BP6-005E1 | LAH24-03H1 | HAF73 (Polymer Ventures) | Slurry 1 |
| BP6-003E2<br>BP6-005E2 | LAH24-03H2 | | Slurry 2 |
| BP6-003F1<br>BP6-005F1 | LAH24-03I1 | HAF63 (Polymer Ventures) | Slurry 1 |
| BP6-003F2<br>BP6-005F2 | LAH24-03I2 | | Slurry 2 |

For mesotrione formulations made using the commercial DRA product InterLock® the following procedure was used. The first step was to prepare a large mill base made by mixing 40.82% Mesotrione (98%) with 19.95%-30.95% water, 4% propylene glycol, dispersing agent (3.75% Ethox™ 5037) and wetting agent (1.25% Ethox™ 4420), and 0.15% SAG® 1572. The mixture was milled to the desired herbicide particle size. Step two included the addition of Slurry 1. After the slurry was found to be appropriately mixed InterLock® was incorporated at 12 wt % in BP6-020 and 23 wt % in LAH22-59 with a paddle blade mixer representing Step 3. After the InterLock® was deemed to be fully incorporated the end products were buffered using phosphoric acid to the desired pH representing step 4. The target mesotrione level in both BP6-020 and LAH22-59 was 40%. The stability of these formulations is described in Table 5.

Methods to determine physical stability were initial and subsequent testing for appearance, active assay, and dilution stability. The acceptable appearance specification is little or no visible bleed layer after a specified period of time that can be resuspended with minimal force applied. Dilution stability gives an indication of how stable the herbicide is when diluted in water. To ensure that a spray solution is adequately homogenous during application, no separation, less than 1 mL precipitation (ppt), or no flocculation would be detected after agitating in a 5 wt % dilution in hard water and being allowing to sit for 30 minutes. The samples' temperature stability was tested by placing the samples in 4° C. for up to 6 weeks, 35° C. for up to 12 weeks, and through two weeks of Freeze/Thaw (F/T) cycles, which means going in and out of a freezer set at approx. −16° C. The results are tabulated in Tables 5, 6, 7 and 8.

TABLE 5

| Lot# | Initial | Appearance 6 wk 35° C. | Appearance 12 wk 35° C. | Resuspends? |
|---|---|---|---|---|
| BP6-020 | Viscous, opaque off-white liq | Viscous, Opaque off-white liq | 1.3% by vol yellow collar on top of opaque off-white liq | Y |
| LAH22-59 | Very viscous, opaque off-white liq | Very viscous, opaque off-white liq | Very viscous, opaque off-white liq | n/a |

Due to formulation viscosity the mesotrione formulations prepared using InterLock® were deemed to be unsuitable for commercial use at the concentrations prepared. Viscosity was measured using a Brookfield® DVE Viscometer usng spindle LV2 at 12 rpm. BP6-020 was measured at 1498 cP and LAH22-59 was not able to be measured due to high viscosity.

TABLE 6

| Lot# | Initial | Appearance 6 wk 4° C. | Appearance 12 wk 35° C. | Resuspends? |
|---|---|---|---|---|
| BP5-044A | Opaque off-white liq | Opaque off-white liq | 2.6% by vol. thin liq on top | Y |
| BP5-044B | Opaque off-white liq | Opaque off-white liq | 2.6% by vol. thin liq on top | Y |

TABLE 7

| Lot# | Initial appearance | Visc., cPs (LV2, 12 rpm) | Appearance after 6 wks in 35° C. oven: Top layer | Bottom layer | Resuspend? |
|---|---|---|---|---|---|
| BP6-002A1 | Opaque off-white liq | 632.0 | 19.2% by vol ylw liq above opaque white liq | Opaque off-white liq | Y |
| BP6-002A2 | Opaque off-white liq | 710.0 | 9.6% by vol ylw liq above opaque white liq | Opaque off-white liq | Y |

TABLE 7-continued

| Lot# | Initial appearance | Visc., cPs (LV2, 12 rpm) | Appearance after 6 wks in 35° C. oven: Top layer | Bottom layer | Resuspend? |
|---|---|---|---|---|---|
| BP6-002B1 | Opaque off-white liq | 720.0 | 17.3% by vol ylw liq above opaque white liq | Opaque off-white liq | Y |
| BP6-002B2 | Opaque off-white liq | 837.5 | 9.6% by vol ylw liq above opaque white liq | Opaque off-white liq | Y |
| BP6-002C1 | Opaque off-white liq | 805.0 | 21.1% by vol ylw liq above opaque white liq | Opaque off-white liq | Y |
| BP6-002C2 | Opaque off-white liq | 822.5 | 13.5% by vol ylw liq above opaque white liq | Opaque off-white liq | Y |
| BP6-002D1 | Opaque off-white liq | 892.5 | 21.1% by vol ylw liq above opaque white liq | Opaque off-white liq | Y |
| BP6-002D2 | Opaque off-white liq | 962.5 | 7.7% by vol ylw liq above opaque white liq | Opaque off-white liq | Y |
| BP6-002E1 | Opaque off-white liq | 902.5 | 7.7% by vol ylw liq above opaque white liq | Opaque off-white liq | Y |
| BP6-002E2 | Opaque off-white liq | 1028 | 3.8% by vol ylw liq above opaque white liq | Opaque off-white liq | Y |
| BP6-002F1 | Opaque off-white liq | 762.5 | 11.5% by vol ylw liq above opaque white liq | Opaque off-white liq | Y |
| BP6-002F2 | Opaque off-white liq | 820.0 | 5.8% by vol ylw liq above opaque white liq | Opaque off-white liq | Y |

TABLE 8

| Lot# | Initial appearance | Pourable? | Appearance after 6 wks in 35° C. oven: Top layer | Bottom layer | Resuspend? |
|---|---|---|---|---|---|
| BP6-003A1<br>BP6-005A1 | Opaque off-white liq | Y<br>Y | 9.6% by vol amber liquid | off white liq | Y |
| BP6-003A2<br>BP6-005A2 | Opaque off-white liq | Y<br>Y | 5.8% by vol light yellow liq | off white liq | Y |
| BP6-003B1 | Opaque off-white gel | N | Not tested due to gelled formula | | |
| BP6-003B2 | Opaque off-white gel | N | | | |
| BP6-003C1 | Opaque off-white gel | N | | | |
| BP6-003C2 | Opaque off-white gel | N | | | |
| BP6-003D1 | Opaque off-white gel | N | | | |
| BP6-003D2 | Opaque off-white gel | N | | | |

TABLE 8-continued

| Lot# | Initial appearance | Pourable? | Appearance after 6 wks in 35° C. oven Top layer | Bottom layer | Resuspend? |
|---|---|---|---|---|---|
| BP6-003E1 BP6-005E2 | Opaque off-white viscous paste | Y Y Y | 1.9% by vol light yellow liq | off white viscous liq | Y |
| BP6-003E2 BP6-005E2 | Opaque off-white viscous paste | Y | 1.9% by vol light yellow liq | off white viscous liq | Y |
| BP6-003F1 BP6-005F1 | Opaque off-white viscous paste | Y Y | 1.9% by vol light yellow liq | off white viscous liq | Y |
| BP6-003F2 BP6-005F2 | Opaque off-white viscous paste | Y Y | 1.9% by vol light yellow liq | off white viscous liq | Y |

The general method used for the preparation of PPO-inhibitor suspension concentrates comprised three steps. In the first step a large mill base was made by mixing 42.13% sulfentrazone (98%) with 40.81% water, 0.5% Cab-O-Sil® M5, 5% dispersing agent (3.75% Ethox™ 5037) and wetting agent (1.25% Ethox™ 4420) and 0.20% SAG® 1572. The mill base was then milled until the herbicide reached the desired particle size. In Step 2 a slurry comprising the thickener wherein the slurry comprised 5% propylene glycol, 0.16% Xanthan gum and 0.2% Proxel® GXL was added to the mill base prepared in Step 1. The slurry was mixed in using a paddle blade. When the slurry was considered properly mixed, 6% Ethox™ OB DRA was added with mixing until properly uniform as Step 3.

From the general procedure described above, a formulation of Sulfentrazone was produced That formulation and its corresponding stability are described in Table 9.

TABLE 9

| Lot# | DRT, 6% | Initial | 2 weeks 4° C. | 2 weeks 45° C. | 6 weeks 45° C. | Re-suspends? |
|---|---|---|---|---|---|---|
| BP6-006 | Ethox OB DRA | Opaque off-white liq | Opaque off-white liq | Opaque off-white liq with 0.7% sep on top | Opaque off-white liq with 0.7% sep on top | Y |

TABLE 10

| Sample ID | Intial | 6 weeks at 4° C. | 6 weeks at 35° C. |
|---|---|---|---|
| BP5-044A | 41.3% | 40.93% | 40.8% |
| BP5-044B | 41.3% | 41.09% | 40.9% |

The results indicate that the mesotrione active concentration remains within the US EPA OPPTS certified limits of the initial result and thus remains chemically stable. According to OPPTS 830.1750, certified limits for an active ingredient between 20.0 and 100.0% is ±3% of the nominal concentration of said active ingredient. For the mesotrione formulations, the nominal concentration is set at 41.30%, which would set the limits at 40.06-42.54%.

For testing DRA performance, a commercial 40% mesotrione containing product (meso SC) and a proven commercial DRA (CDRA) were used as a tank mix (TM) standard (std) against the all-in-one experimental product using OB DRA. A tank mix containing glyphosate, Roundup PowerMAX® 3 (RUPM3), was also sprayed with HPPD- and PPO-inhibitors including DRAs to evaluate the interaction of a multiple active system for a single spray application. The spray trials used an AIXR 11004 nozzle at 40 psi. Spray concentrations were as follows: meso SC at 3 oz/acre (0.14% by wt), RUPM3 at 30 oz/acre (1.57% by wt), sulfentrazone at 10 oz/acre (0.49%), and CDRA at 4 oz/acre (0.20%). All mixtures were prepared to achieve the designated use rate at a spray volume of 15 gallons per acre (gpa). The % fines and DV 50 results were measured using a Sympatec HELOS Laser with an R7 lens and results were analyzed using the Sympatec software.

In spray tests with sulfentrazone and 6% OB DRA, the fine particles created are comparable to the results obtained with mesotrione examples confirming that the OB DRA works with a PPO inhibitor, as well.

At 0.1% the waterborne polyacrylamides and polyacrylates in a mesotrione formulation created 2-2.7× more fine particles than the oil-based polymer at 12%. When combined with RUPM3, there were 2.7-3.3× more fine particles. At 1% WB polyacrylamides and polyacrylates created 2.2-2.6× more fine particles. When added to RUPM3, 2.6-3.2× more fine particles.

Figure 4:
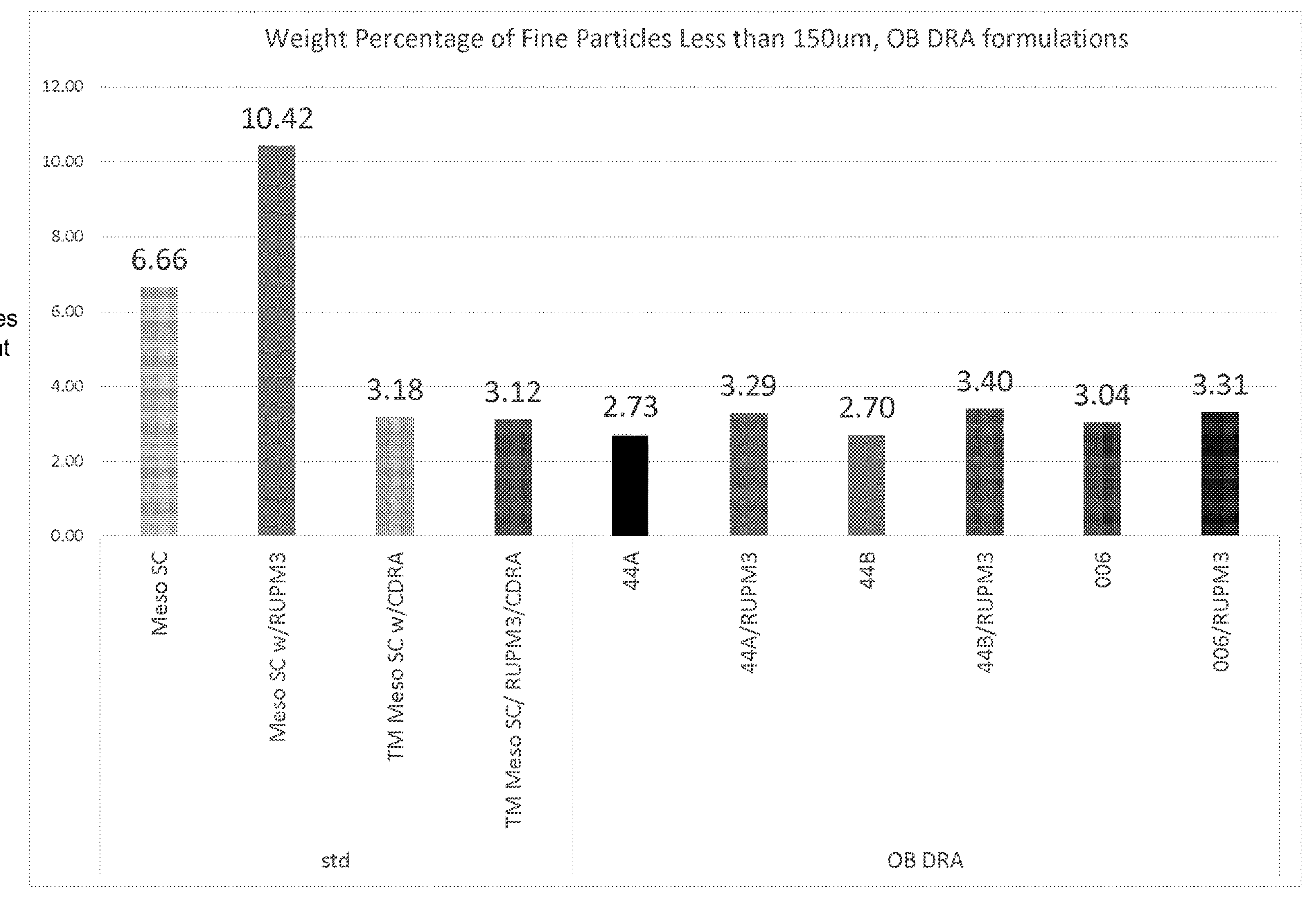
FIG. 4 is a graphical representation of wt % fine particles less than 150 μm in commercial products versus OB DRA compositions.
Figure 5:
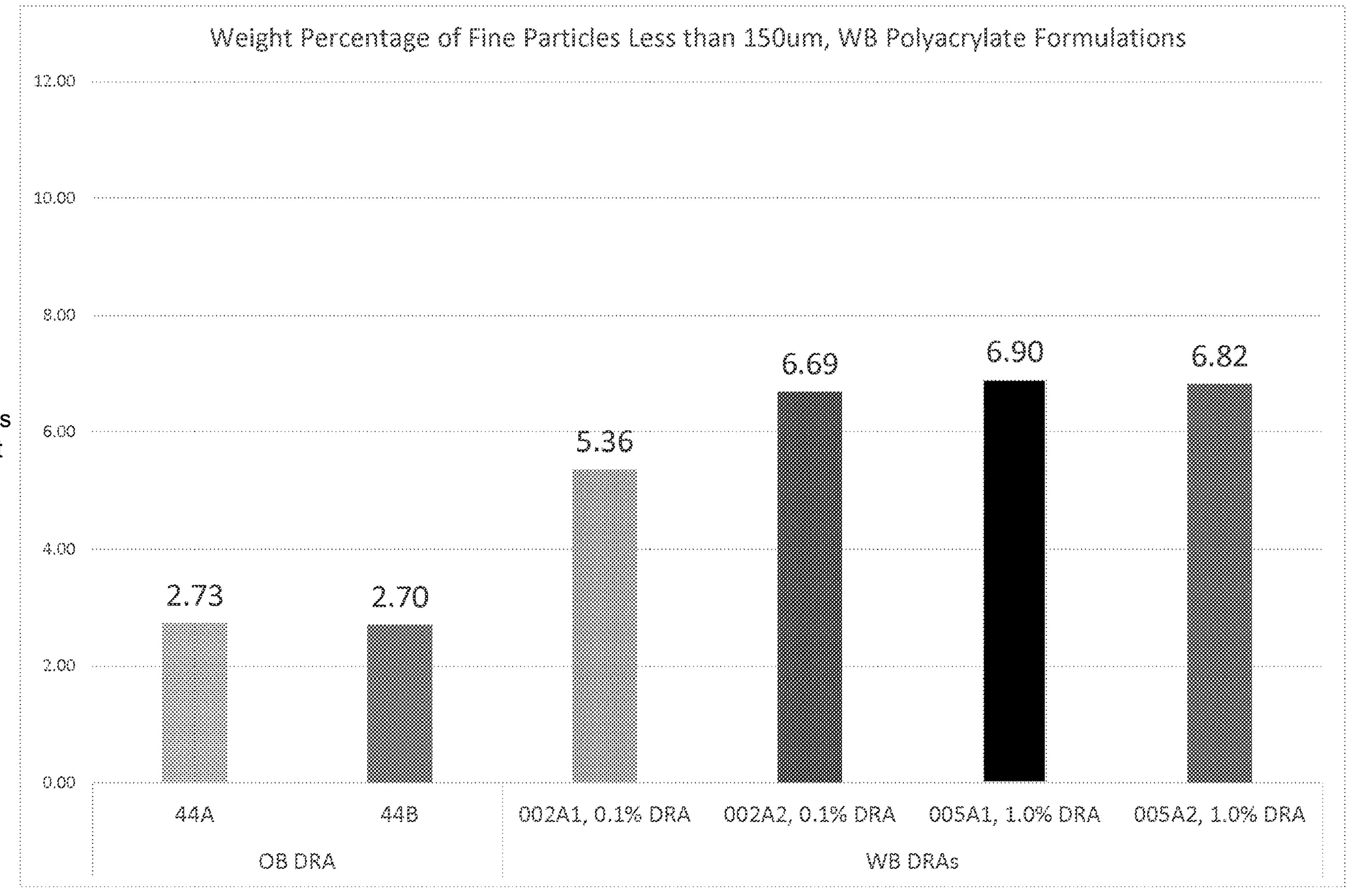
FIG. 5 is a graphical representation of wt % fine particles less than 150 μm in OB DRA compositions versus compositions comprising waterborne Polyacrylate DRAs.
Figure 6:
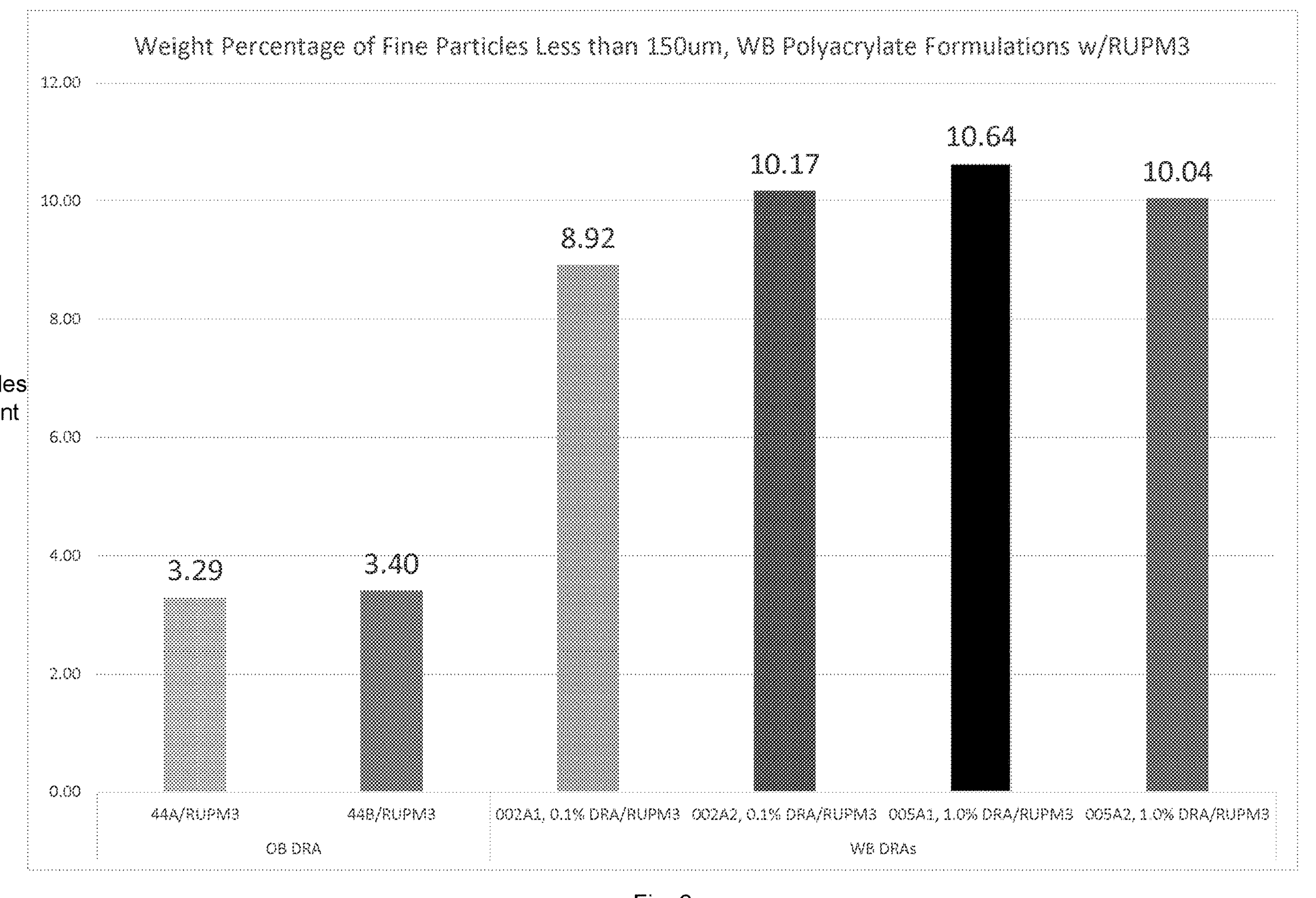
FIG. 6 is a graphical representation of wt % fine particles less than 150 μm OB DRA compositions versus compositions comprising waterborne Polyacrylate DRAs with RUPM3.
Figure 7:
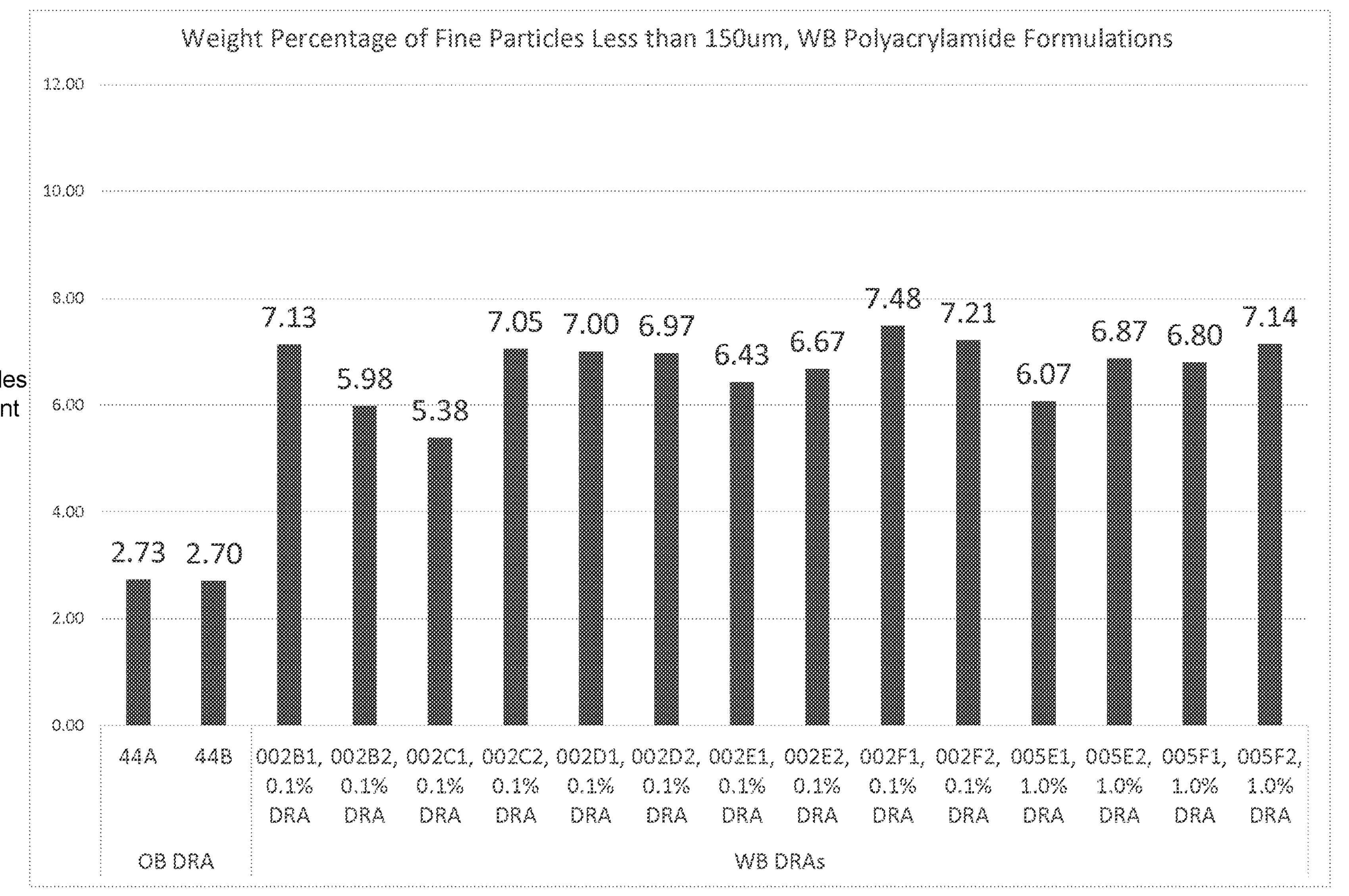
FIG. 7 is a graphical representation of wt % fine particles less than 150 μm OB DRA compositions vs. compositions comprising waterborne Polyacrylamide DRAs.
Figure 8:
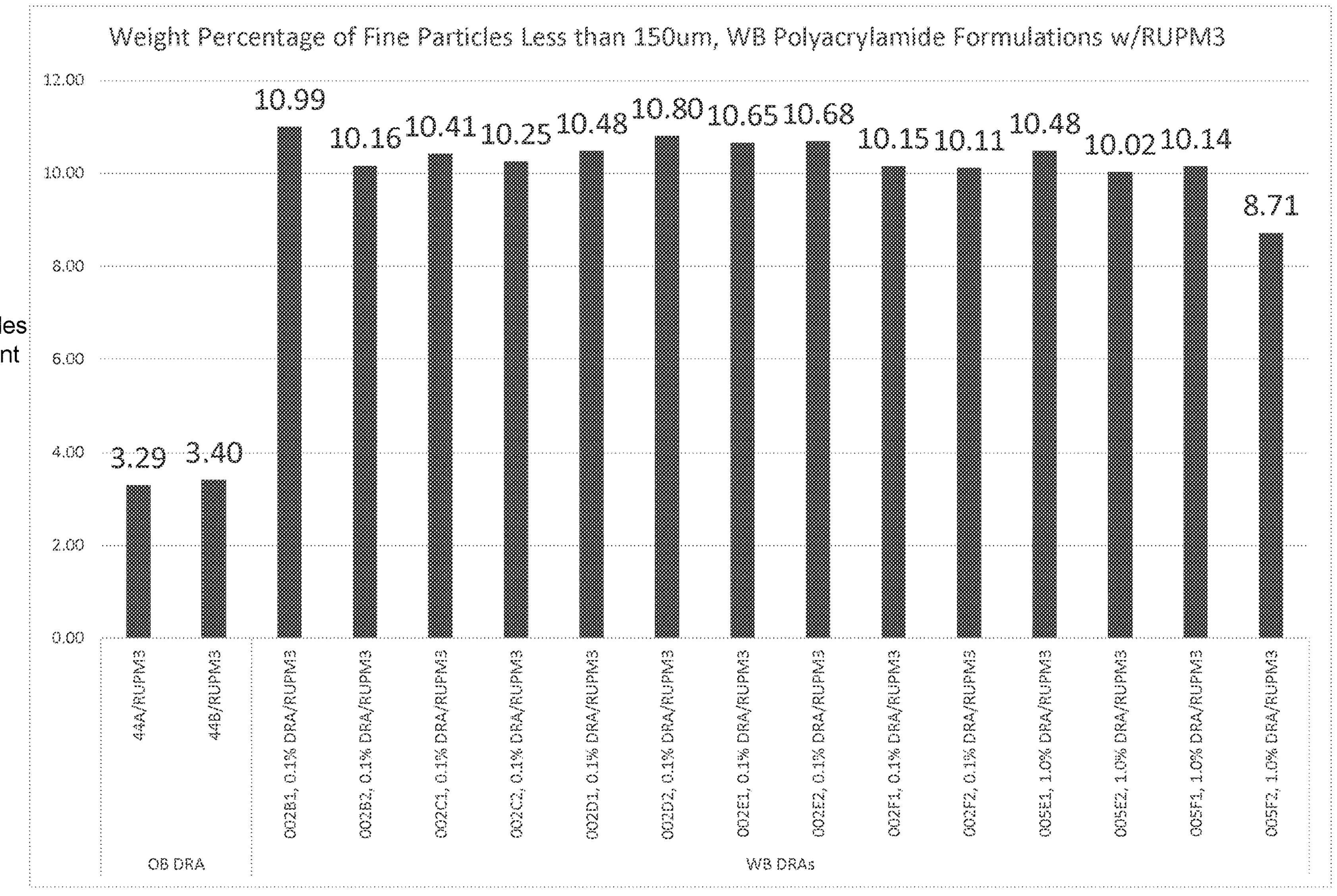
FIG. 8 is a graphical representation of wt % fine particles less than 150 μm OB DRA compositions vs. compositions comprising waterborne Polyacrylamide DRAs with RUPM3A.

FIG. 4 is a comparison of wt % fine particles less than 150 μm, commercial products vs. OB DRA. FIG. 5 is a comparison of wt % fine particles less than 150 μm, OB DRA vs. waterborne Polyacrylate DRAs. FIG. 6 is a comparison of wt % fine particles less than 150 μm, OB DRA vs. waterborne Polyacrylate DRAs with RUPM3. FIG. 7 is a comparison of wt % fine particles less than 150 μm, OB DRA vs. waterborne Polyacrylamide DRAs. FIG. 8 is a comparison of wt % fine particles less than 150 μm, OB DRA vs. waterborne Polyacrylamide DRAs with RUPM3.

A second round of spray chamber testing was conducted using the same equipment described in paragraph 39 to Mesotrione containing formulations, formulated with Ethox™ OB DRA were also tested for chemical stability at elevated temperatures in order to demonstrate that the formulations maintained chemical stability of the herbicide. The formulations were prepared using the procedure described above for BP5-044A and BP5-044B. The sample was separated into three aliquots and placed under the following conditions, initial (freshly prepared), 4° C. and 35° C. The mesotrione level was measured from the initial, freshly prepared sample and also from the sample that was stored for 6 weeks at 4° C. and the sample that was stored for 6 weeks at 35° C.

Determination of Mesotrione was performed by HPLC with detection at 230 nm. Samples were prepared in 40% acetonitrile and water. Separation was performed on an Agilent 1100 series HPLC equipped with a Thermo Scientific BDS Hypersil Phenyl column using a mobile phase of 60% 10 mM phosphoric acid, 40% acetonitrile and isocratic conditions. The data is described in Table 10.

confirm results. These studies focused on formulations containing 40% mesotrione with various materials added with the purpose of testing their effect on the percentage of fine particles (<150 micron) average particle size (DV50). The concentrated formulations were diluted according to the description below in order to carry out the spray chamber testing. In some cases a second herbicide, RUPM3, was added to the diluted spray mixture for spray chamber testing. The concentrated two liter mix size was used to generate three or more replications per treatment. Presented in Tables 11 and 12 is the average of three consistent replications. Mesotrione products—Callisto®, LAH24-07 A1&C1, and LAH24-03 A1-11 were prepared at 3 fl oz/a, equivalent to 3.1 ml/2 L at 15 gpa. InterLock® was prepared at 4 fl oz/a, equivalent to 4.2 ml/2 L at 15 gpa. Roundup PowerMax® 3 was prepared at 30 fl oz/a, equivalent to 31.3 ml/2 L at 15 gpa.

Table 11. Volume median diameter (Dv50) and percentage of droplets less than 150 μm (Pct<150 μm) for mesotrione treatments sprayed with AIXR11004 at 40 psi and 15 gpa.

TABLE 11

| Treatment* | In-can DRA | DRA Type | Dv50 μm | Pct < 150 % |
|---|---|---|---|---|
| Callisto ® | — | — | 449 | 5.22 |
| Callisto ® + InterLock ® | — | — | 466 | 3.95 |
| LAH24-07 C1 | — | — | 439 | 6.42 |
| LAH24-07 A1 | Ethox OB DRA | oil-based | 467 | 3.71 |
| LAH24-03 A1 | SC-1604[1] | polyacrylate | 433 | 6.99 |
| LAH24-03 G1 | SC-1604[2] | polyacrylate | 442 | 7.16 |
| LAH24-03 B1 | A130[1] | polyacrylamide | 448 | 8.09 |
| LAH24-03 C1 | A150[1] | polyacrylamide | 444 | 7.25 |
| LAH24-03 D1 | N300[1] | polyacrylamide | 436 | 7.64 |
| LAH24-03 E1 | HAF73[1] | polyacrylamide | 445 | 7.33 |
| LAH24-03 H1 | HAF73[2] | polyacrylamide | 438 | 7.82 |
| LAH24-03 F1 | HAF63[1] | polyacrylamide | 446 | 6.56 |
| LAH24-03 I1 | HAF63[2] | polyacrylamide | 439 | 7.32 |

*Callisto ®, LAH24-07 A1&C1, LAH24-03 A1-I1 sprayed at 3 fl oz/a rate; InterLock ® sprayed at 4 fl oz/a rate.
[1]DRA at 0.1%
[2]DRA at 1%

Table 12 provides the volume median diameter (Dv50) and percentage of droplets less than 150 μm (Pct<150 μm) for mesotrione+Roundup PowerMax® 3 (RUPM3) treatments sprayed with AIXR11004 at 40 psi and 15 gpa.

TABLE 12

| Treatment* | In-can DRA | DRA Type | Dv50 μm | Pct < 150 % |
|---|---|---|---|---|
| Callisto ® + RUPM3 | — | — | 353 | 9.26 |
| Callisto ® + InterLock ® + RUPM3 | — | — | 430 | 4.26 |
| LAH24-07 C1 + RUPM3 | — | — | 329 | 12.95 |
| LAH24-07 A1 + RUPM3 | Ethox OB DRA | oil-based | 429 | 3.85 |
| LAH24-03 A1 + RUPM3 | SC1640[1] | polyacrylate | 350 | 10.37 |
| LAH24-03 G1 + RUPM3 | SC1640[2] | polyacrylate | 338 | 11.89 |
| LAH24-03 B1 + RUPM3 | A130[1] | polyacrylamide | 353 | 10.11 |
| LAH24-03 C1 + RUPM3 | A150[1] | polyacrylamide | 334 | 12.33 |
| LAH24-03 D1 + RUPM3 | N300[1] | polyacrylamide | 345 | 11.51 |
| LAH24-03 E1 + RUPM3 | HAF73[1] | polyacrylamide | 343 | 11.02 |
| LAH24-03 H1 + RUPM3 | HAF73[2] | polyacrylamide | 337 | 11.91 |
| LAH24-03 F1 + RUPM3 | HAF63[1] | polyacrylamide | 343 | 11.56 |
| LAH24-03 I1 + RUPM3 | HAF63[2] | polyacrylamide | 353 | 10.27 |

*Callisto ®, LAH24-07 A1&C1, LAH24-03 A1-I1 sprayed at 3 fl oz/a rate; InterLock ® sprayed at 4 fl oz/a rate; Roundup PowerMax ® 3 sprayed at 30 fl oz/a.
[1]DRA at 0.1%
[2]DRA at 1%

A particle drift study was conducted in a low-speed wind tunnel at the Pesticide Application Technology Laboratory (University of Nebraska-Lincoln). All the treatments tested were prepared with the addition of 1,3,6,8-pyrene tetrasulfonic acid tetrasodium salt (PTSA) fluorescent tracer at 3 g/L. Tank-mixes were sprayed in the low-speed wind tunnel using three nozzles (AIXR11004, GA11004 and TDXL11004) at 40 psi for 3 sec under a 10 mph airstream. Nozzles were arranged perpendicular to the wind tunnel and wind flow as in a real-life application scenario. Mylar cards (4×4 inches) were used to collect downwind particle drift deposition 1, 2, 3, 6, 8, and 12 meters (m) from the nozzle. Downwind deposition data at 12 m is not shown as there was no deposition collected across all treatments. Applications were performed at 20 inch height in relation to Mylar cards. Each treatment (tank-mix by nozzle) was replicated three times.

Figure 2:
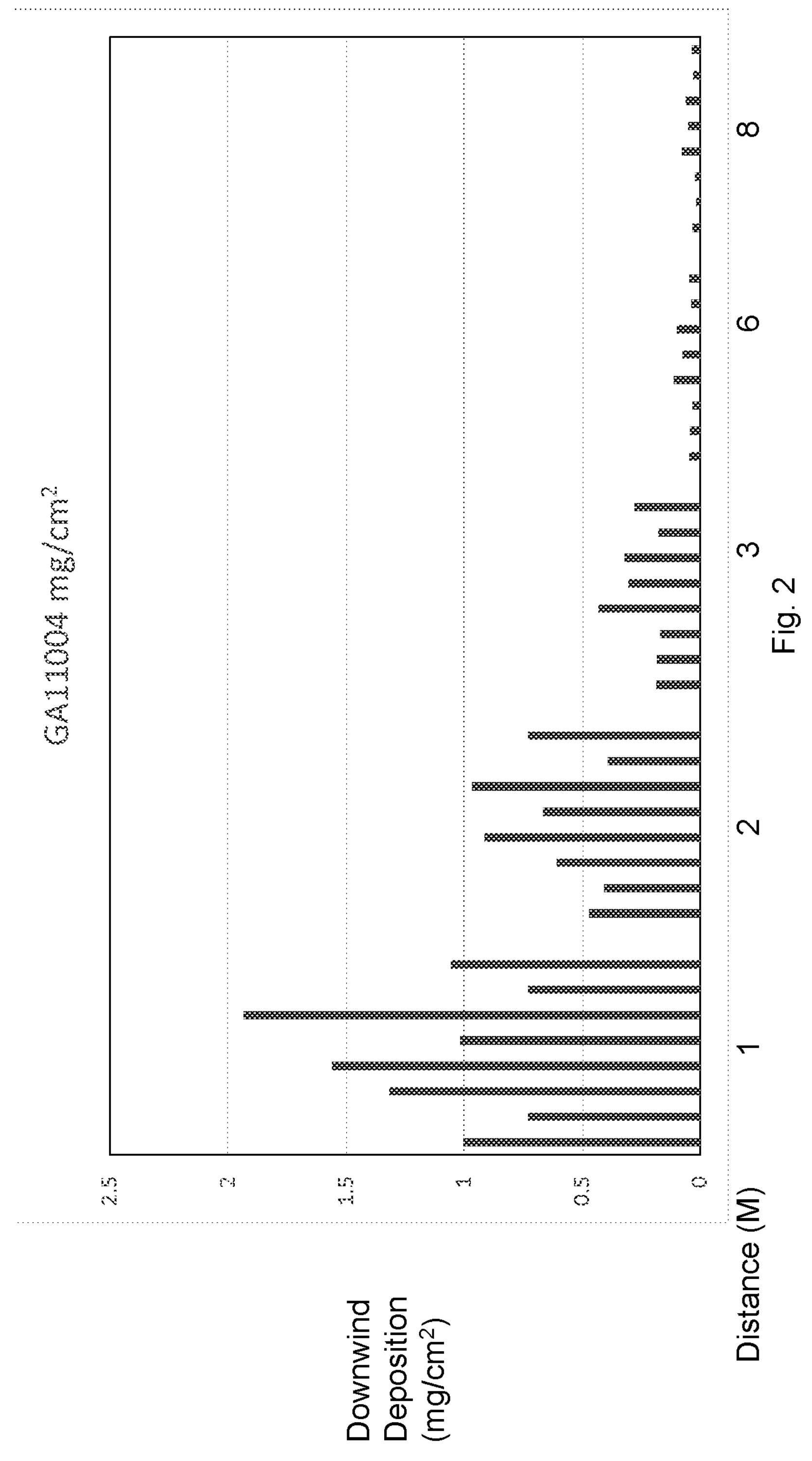
FIG. 2 is a graphical representation of downwind deposition for eight compositions from the GA11004 Nozzle.
Figure 3:
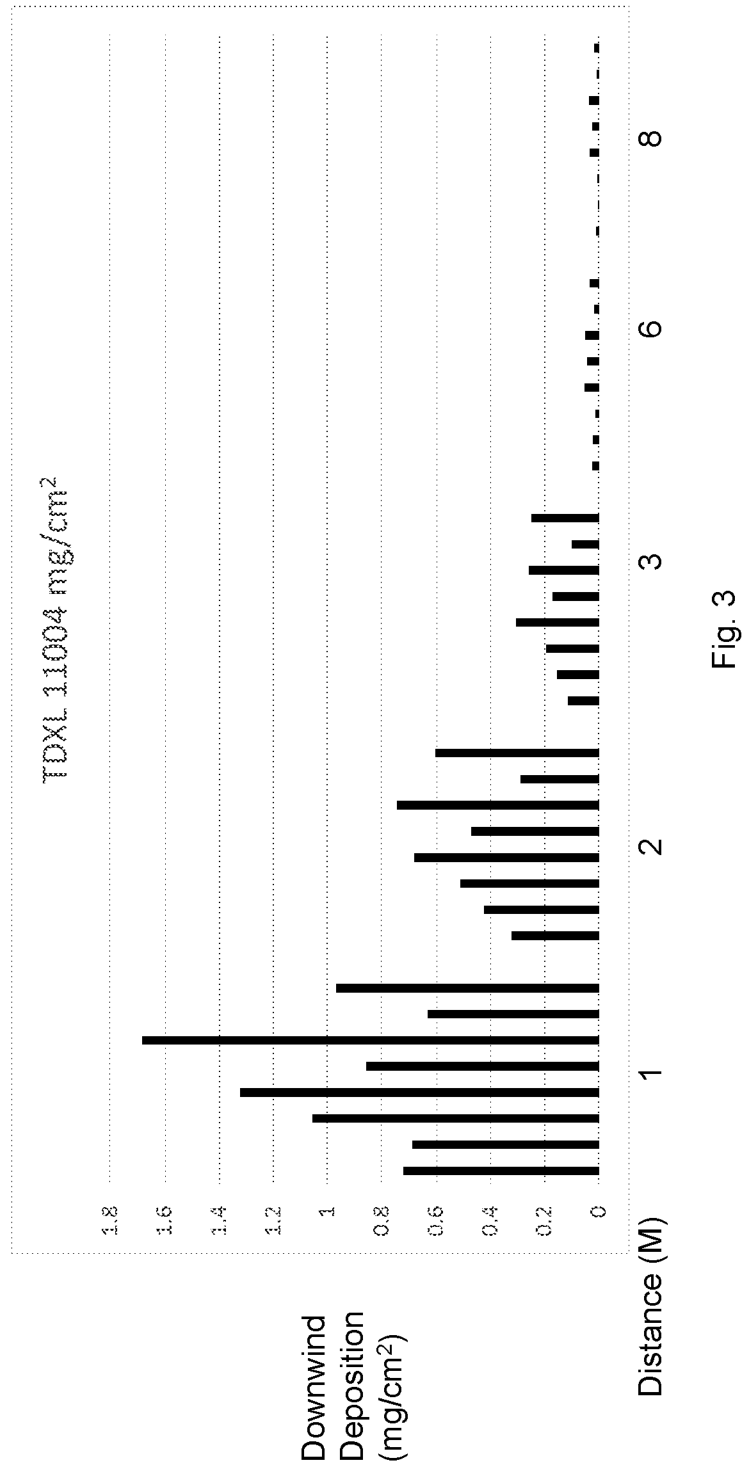
FIG. 3 is a graphical representation of downwind deposition for eight compositions from the TDXL 11004 Nozzle.

Mylar cards were collected after 30 sec following applications and placed into prelabeled plastic zip-top bags. Zip-top bags with Mylar cards were placed in a dark container immediately following collection to avoid PTSA photodegradation. Spray particle drift deposition was determined for each Mylar card with fluorometric analysis at the Pesticide Application Technology Laboratory. Mylar cards were washed using 40 ml of a 9:1 solution of distilled water and 91% isopropyl alcohol. With the tracer completely suspended, a 5 ml aliquot was transferred to a glass cuvette and analyzed using a Flame spectrofluorometry. Relative fluorescence unit data were converted into micrograms of PTSA per $cm^2$ (Mylar card) using a calibration curve for the tracer. FIGS. 1-3 illustrate the spray deposition ($mg/cm^2$) for the AIXR11004, GA11004 and TDXL 11004 nozzles at 1, 2, 3, 6, and 8 m downwind. In each Figure the samples at each distance are in the repeating order, from left to right: Callisto®; Callisto® plus InterLock®; Callisto® plus Reign®; Callisto® plus RUPM 3; Callisto® plus RUPM 3 plus InterLock®; Callisto® plus RUPM 3 plus Reign®; LAH24-07A; and LAH24-07A plus RUPM 3 at each distance. The data indicates that the formulation LAH24-07A is at least as effective at reducing off target deposition as the commercial oil-based DRT InterLock®, and both are more effective than the commercial water based drift reducing agent Reign®.

As illustrated in the examples the inventive formulation provides less than 6 wt % fine particles of less than 150 μm and more preferably less than 4 wt % fine particles of less than 150 μm with an oil-based drift control agent without the necessity of additional ingredients.

Unless stated to the contrary all percentages are wt %.

The invention has been described with reference to preferred embodiments without limit thereto. One of skill in the art would realize additional embodiments which are described and set forth in the claims appended hereto.

The invention claimed is:

1. An agrochemical formulation comprising:

10-70 wt % of at least one herbicide selected from the group consisting of a 4-hydroxyphenylpyruvate dioxygenase inhibiting herbicide and a protoporphyrinogen oxidase inhibiting herbicide; and 10-30 wt % of an oil-based drift control agent comprising 85-94.5 wt % of methylated soybean oil, 0.5-3 wt % of polyethoxylated (POE) tall oil fatty acid and 5-12 wt % of POE glycerin esterified with 12 hydroxy stearic acid.

2. The agrochemical formulation of claim 1, wherein said 4-hydroxyphenylpyruvate dioxygenase inhibiting herbicide is selected from the group consisting of Isoxazoles; Isoxaflutole; Pyrazoles; Benzofenap; Pyrasulfotole; Pyrazolynate;

Pyrazoxyfen; Topramezone; Tolpyralate; Triketones; Benzobicyclon; Bicyclopyrone; Fenquinotrione; Mesotrione; Sulcotrione; Tembotrione and Tefuryltrione.

3. The agrochemical formulation of claim 1, wherein said protoporphyrinogen oxidase inhibiting herbicide is selected from the group consisting of diphenyl ethers; Lactofen; Acifluorfen; Bifenox; Chlornitrofen; Fomesafen; Fluorodifen; Fluoroglycofen-ethyl; Fluoronitrofen; Nitrofen; Oxyfluorfen; Chlomethoxyfen; Phenylpyrazoles; Pyraflufen-ethyl; N-Phenyl-oxadiazolones; Oxadiargyl; Oxadiazon; N-Phenyl-triazolinones; Azafenidin; Carfentrazone-ethyl; Sulfentrazone; N-Phenyl-imides; Fluthiacet-methyl; Butafenacil; Saflufenacil; Pentoxazone; Chlorphthalim; Cinidon-ethyl; Flumiclorac-pentyl; Flumioxazin; Flumipropyn; Trifludimoxazin; Tiafenacil and Pyraclonil.

4. The agrochemical formulation of claim 1, wherein said POE tall oil fatty acid is ethoxylated with 3-20 ethylene oxide groups.

5. The agrochemical formulation of claim 1, wherein said glycerin is ethoxylated with 3-35 ethylene oxide groups.

6. The agrochemical formulation of claim 1, comprising no more than 25 wt % of additive selected from the group consisting of polymers, natural product thickeners and metal additives.

7. The agrochemical formulation of claim 1, comprising no more than 5 wt % of additive selected from the group consisting of polymers, natural product thickeners and metal additives.

8. The agrochemical formulation of claim 1, comprising no more than 0.5 wt % of additive selected from the group consisting of polymers, natural product thickeners and metal additives.

9. The agrochemical formulation of claim 6, wherein said polymers are selected from the group consisting of polyacrylamides and polyacrylates.

10. The agrochemical formulation of claim 6, wherein said natural product thickeners are guar gum.

11. The agrochemical formulation of claim 6, wherein said metal additives are copper.

12. The agrochemical formulation of claim 1, further comprising water.

13. The agrochemical formulation of claim 1, comprising 20-60 wt % of said at least one herbicide and 10-30 wt % of said oil-based drift control agent.

14. The agrochemical formulation of claim 13, comprising 40-50 wt % of said at least one herbicide.

15. The agrochemical formulation of claim 1, wherein said formulation does not comprise an auxin based herbicide.

16. The agrochemical formulation of claim 1, with a fine particle reduction of at least 5 wt % to no more 75 wt % with no more than 25% increase in average particle size.

17. The agrochemical formulation of claim 16, wherein said fine particle reduction is at least 10 wt % to no more than 40 wt %.

18. The agrochemical formulation of claim 17, wherein said fine particle reduction is at least 15 wt % to no more than 30 wt %.

19. The agrochemical formulation of claim 18, wherein said fine particle reduction is at least 20 wt % to no more than 25 wt %.

20. The agrochemical formulation of claim 1, wherein said at least one herbicide has a concentration that drops less than 3 wt % after storage for 12 weeks at 35° C.

21. An agrochemical formulation comprising: 10-70 wt % of at least one herbicide selected from the group consisting of Mesotrione and Sulfentrazone; and 10-30 wt % of an oil-based drift control agent comprising 85-94.5 wt % of methylated soybean oil, 0.5-3 wt % of POE tall oil fatty acid and 5-12 wt % of POE glycerin esterified with 12 hydroxy stearic acid.

22. The agrochemical formulation of claim 21, further comprising at least one 4-hydroxyphenylpyruvate dioxygenase inhibiting herbicide selected from the group consisting of Isoxazoles; Isoxaflutole; Pyrazoles; Benzofenap; Pyrasulfotole; Pyrazolynate; Pyrazoxyfen; Topramezone; Tolpyralate; Triketones; Benzobicyclon; Bicyclopyrone; Fenquinotrione; Sulcotrione; Tembotrione and Tefuryltrione.

23. The agrochemical formulation of claim 21, further comprising at least one protoporphyrinogen oxidase inhibiting herbicide selected from the group consisting of diphenyl ethers; Lactofen; Acifluorfen; Bifenox; Chlornitrofen; Fomesafen; Fluorodifen; Fluoroglycofen-ethyl; Fluoronitrofen; Nitrofen; Oxyfluorfen; Chlomethoxyfen; Phenylpyrazoles; Pyraflufen-ethyl; N-Phenyl-oxadiazolones; Oxadiargyl; Oxadiazon; N-Phenyl-triazolinones; Azafenidin; Carfentrazone-ethyl; N-Phenyl-imides; Fluthiacet-methyl; Butafenacil; Saflufenacil; Pentoxazone; Chlorphthalim; Cinidon-ethyl; Flumiclorac-pentyl; Flumioxazin; Flumipropyn; Trifludimoxazin; Tiafenacil and Pyraclonil.

24. The agrochemical formulation of claim 21, wherein said POE tall oil fatty acid is ethoxylated with 3-20 ethylene oxide groups.

25. The agrochemical formulation of claim 21, wherein said glycerin is ethoxylated with 3-35 ethylene oxide groups.

26. The agrochemical formulation of claim 21, comprising no more than 25 wt % of additive selected from the group consisting of polymers, natural product thickeners and metal additives.

27. The agrochemical formulation of claim 21, comprising no more than 5 wt % of additive selected from the group consisting of polymers, natural product thickeners and metal additives.

28. The agrochemical formulation of claim 21, comprising no more than 0.5 wt % of additive selected from the group consisting of polymers, natural product thickeners and metal additives.

29. The agrochemical formulation of claim 26, wherein said polymers are selected from the group consisting of polyacrylamides and polyacrylates.

30. The agrochemical formulation of claim 26, wherein said natural product thickeners are guar gum.

31. The agrochemical formulation of claim 21, comprising 20-60 wt % of said at least one herbicide and 10-30 wt % of said oil-based drift control agent.

32. The agrochemical formulation of claim 31, comprising 40-50 wt % of said at least one herbicide.

33. The agrochemical formulation of claim 21, wherein said formulation does not comprise an auxin based herbicide.

34. The agrochemical formulation of claim 21, with a fine particle reduction of at least 5 wt % to no more 75 wt % with no more than 25% increase in average particle size.

35. The agrochemical formulation of claim 34, wherein said fine particle reduction is at least 10 wt % to no more than 40 wt %.

36. The agrochemical formulation of claim 35, wherein said fine particle reduction is at least 15 wt % to no more than 30 wt %.

37. The agrochemical formulation of claim 36, wherein said fine particle reduction is at least 20 wt % to no more than 25 wt %.

38. The agrochemical formulation of claim 21, wherein said at least one herbicide has a concentration that drops less than 3 wt % after storage for 12 weeks at 35° C.

* * * * *